(12) United States Patent
 Trivedi

(10) Patent No.: US 12,338,400 B2
(45) Date of Patent: Jun. 24, 2025

(54) MANUFACTURE OF RENEWABLE DISTILLATE FROM BIO-OILS

(71) Applicant: ExxonMobil Technology and Engineering Company, Annandale, NJ (US)

(72) Inventor: Kirtan K. Trivedi, Shenandoah, TX (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 0 days.

(21) Appl. No.: 17/823,090

(22) Filed: Aug. 30, 2022

(65) Prior Publication Data
US 2023/0101213 A1    Mar. 30, 2023

Related U.S. Application Data

(60) Provisional application No. 63/261,455, filed on Sep. 21, 2021.

(51) Int. Cl.
 *C10G 49/00* (2006.01)
 *C10G 65/04* (2006.01)
 *C10G 65/12* (2006.01)

(52) U.S. Cl.
 CPC ......... *C10G 49/002* (2013.01); *C10G 65/043* (2013.01); *C10G 65/12* (2013.01);
 (Continued)

(58) Field of Classification Search
 CPC ... C10G 3/46; C10G 3/50; C10G 3/60; C10G 45/44; C10G 47/00; C10G 49/002;
 (Continued)

(56) References Cited

U.S. PATENT DOCUMENTS 4,451,677 A * 5/1984 Bradley ............... C07C 29/141
                                                568/881
6,299,759 B1   10/2001 Bradway et al.
                  (Continued)

OTHER PUBLICATIONS

International Search Report and Written Opinion received for PCT Application No. PCT/US2022/075617, mailed on Feb. 17, 2023, 8 pages.

*Primary Examiner* — Prem C Singh
*Assistant Examiner* — Brandi M Doyle
(74) *Attorney, Agent, or Firm* — Shook Hardy & Bacon L.L.P.

(57) ABSTRACT

Systems and methods are provided for hydroprocessing of bio-derived feeds, such as bio-oils and/or other types of feeds including triglycerides, fatty acids, and/or fatty acid derivatives. The systems and methods can assist with maintaining a desired temperature profile within a reactor while performing hydroprocessing on a feed with substantial oxygen content. In various aspects, the initial bed of the reactor can be exposed to 30 vol % or less of the total fresh feed. The remaining portions of the fresh feed can be introduced below one or more of the catalyst beds in the reactor. By reducing or minimizing the amount of fresh feed introduced upstream from the initial catalyst bed that contains a catalyst with hydrodeoxygenation activity, the net amount of product recycle can be reduced or minimized while still maintaining a target temperature profile across individual catalyst beds and/or across the reactor.

20 Claims, 6 Drawing Sheets

(52) U.S. Cl.
CPC ............... *C10G 2300/301* (2013.01); *C10G 2300/4006* (2013.01); *C10G 2400/04* (2013.01)

(58) Field of Classification Search
CPC ............... C10G 65/043; C10G 65/12; C10G 2300/4006; C10G 2300/301; C10G 2300/1018; C10G 2300/1014; C10G 2400/04; Y02P 30/20
See application file for complete search history.

(56) References Cited

U.S. PATENT DOCUMENTS

| | | |
|---|---|---|
| 9,279,087 B2 | 3/2016 | Kokayeff et al. |
| 9,464,238 B2 | 10/2016 | Hanks et al. |
| 9,617,479 B2 | 4/2017 | Fingland et al. |
| 2010/0137662 A1* | 6/2010 | Sechrist ............... C10G 45/02 585/240 |
| 2012/0059209 A1* | 3/2012 | Chapus ............... C10L 1/08 585/733 |
| 2013/0012746 A1* | 1/2013 | Luebke ............... C10G 45/04 585/251 |
| 2014/0135544 A1* | 5/2014 | Kalnes ............... C10G 65/04 422/600 |

* cited by examiner

|  | Region 1 | Region 2 | Region 3 | Region 4 | Region 5 | Region 6 |
|---|---|---|---|---|---|---|
| Fresh Feed Mass (lb/hr) | 15055 | 18068 | 24253 | 32741 | 40800 |  |
| Percentage of Total Fresh Feed (wt%) | 12 | 14 | 19 | 25 | 31 |  |
| Fresh Feed Temp (°C) | 293 | 121 | 121 | 121 | 121 |  |
| Fresh $H_2$ mass (lb/hr) | 17707 |  |  |  |  |  |
| Fresh $H_2$ Temp (°C) | 293 |  |  |  |  |  |
| Effluent from Prior Bed (lb/hr) |  | 32763 | 50830 | 75083 | 107823 | 148624 |
| Deoxygenated Oil |  | 12753 | 28057 | 48601 | 76334 | 110895 |
| $H_2O$ |  | 1673 | 3682 | 6377 | 10016 | 14551 |
| Light Ends |  | 1111 | 2444 | 4234 | 6649 | 9660 |
| $H_2$ |  | 17225 | 16647 | 15871 | 14823 | 13518 |
| Temp of Effluent from Prior Bed (°C) (Pre-Cooling) |  | 342 | 342 | 342 | 342 | 342 |
| Temp of Effluent from Prior Bed (°C) (Post-Cooling) |  | 317 | 316 | 314 | 315 |  |
| Total Mass in Region (lb/hr) | 32763 | 50830 | 75083 | 107823 | 148624 | 148624 |
| Total Feed Temp (°C) | 287 | 287 | 287 | 287 | 287 |  |
| Liquid Wt. Fraction of Total Feed in Region | 0.27 | 0.32 | 0.45 | 0.57 | 0.65 |  |
| WABT of Prior Bed |  | 324 | 324 | 324 | 324 | 324 |
|  |  |  |  |  |  |  |

FIG. 5

|  | Region 1 | Region 2 | Region 3 | Region 4 | Region 5 | Region 6 |
|---|---|---|---|---|---|---|
| Fresh Feed Mass (lb/hr) | 14995 | 19637 | 28489 | 41519 | 26275 |  |
| Percentage of Total Fresh Feed (wt%) | 11 | 15 | 22 | 32 | 20 |  |
| Fresh Feed Temp (°C) | 293 | 121 | 121 | 121 | 121 |  |
| Fresh $H_2$ mass (lb/hr) | 17707 | 2211 | 2970 | 4168 | 4497 |  |
| Fresh $H_2$ Temp (°C) | 293 | 93 | 93 | 93 | 93 |  |
| Effluent from Prior Bed (lb/hr) |  | 32702 | 54551 | 86010 | 131698 | 162470 |
|   Deoxygenated Oil |  | 12702 | 29336 | 53468 | 88638 | 108721 |
|   $H_2O$ |  | 1667 | 3849 | 7016 | 11630 | 14548 |
|   Light Ends |  | 1106 | 2555 | 4658 | 7721 | 9655 |
|   $H_2$ |  | 17227 | 18810 | 20869 | 28205 | 27362 |
| Temp of Effluent from Prior Bed (°C) |  | 342 | 342 | 342 | 342 | 342 |
| Total Mass in Region (lb/hr) | 30799 | 54551 | 86010 | 131698 | 162470 | 162470 |
| Total Feed Temp (°C) | 287 | 287 | 287 | 287 | 287 |  |
| Liquid Wt. Fraction of Total Feed in Region | 0.27 | 0.31 | 0.41 | 0.50 | 0.33 |  |
| WABT of Prior Bed |  | 324 | 324 | 324 | 324 | 324 |
|  |  |  |  |  |  |  |

FIG. 6

MANUFACTURE OF RENEWABLE DISTILLATE FROM BIO-OILS

CROSS-REFERENCE TO RELATED APPLICATIONS

This application claims the benefit of U.S. Provisional Application No. 63/261,455, filed on Sep. 21, 2022, the entire contents of which are incorporated herein by reference.

FIELD

This invention relates to conversion of bio-oils to distillate boiling range fuels while managing heat release during the conversion process.

BACKGROUND

One of the pathways to forming renewable fuels is to form renewable diesel fuels from triglyceride feeds, bio-oils, and/or other types of biomass-derived feeds that include fatty acids or fatty acid derivatives, such as fatty acid alkyl esters or triglycerides. Many types of fatty acids and/or bio-oils can have a carbon chain lengths between $C_{10}$ and $C_{22}$, so that such fatty acids/fatty acid derivatives and/or bio-oils are a useful starting point for formation of diesel fuel or other distillate boiling range fuels.

Feeds containing bio oils, triglycerides, fatty acids, and/or fatty acid derivatives also typically contain a substantial amount of oxygen. For example, a triglyceride typically includes a total of six oxygen atoms, corresponding to an ester linkage between the propyl backbone and the long carbon chain of the fatty acid. It is typically desirable to remove the oxygen from a distillate boiling range fraction prior to using such a fraction as a fuel.

Unfortunately, in a commercial scale reactor, attempting to remove oxygen from a feed containing bio-oils, fatty acids, and/or fatty acid derivatives can result in a large, localized heat release. In a conventional hydrotreating reactor, this heat release can potentially result in localized temperature increases on the order of several hundred degrees Celsius. This type of localized heat release is undesirable in a reactor, as it can lead to a variety of problems for catalyst beds in the reactor and/or the structural integrity of the reactor itself. As a result, conventional methods for performing deoxygenation on feeds containing bio-oils, fatty acids, and/or fatty acid derivatives typically include a substantial amount of recycle of product and/or addition of other streams that are relatively unreactive under deoxygenation conditions. The recycle dilutes the fresh feed with product that is already deoxygenated. This reduces the density of oxygen in the feed, resulting in a smaller heat release per unit time in a given localized volume. However, the substantial amount of recycle (and/or low reactivity streams) that is required means that the size of the reactor and/or various support components (e.g., pumps, separators, fired heater, heat exchangers) needed to perform the deoxygenation is substantially increased. It would be desirable to have methods for processing bio-oils, glyceride-containing feeds, and/or other feeds containing fatty acids and/or fatty acid derivatives to remove oxygen while reducing or minimizing the amount of product recycle that is needed.

U.S. Pat. No. 6,299,759 describes methods for hydroprocessing a feed in a reactor while maintaining a temperature and/or pressure profile. The methods include using bypass to allow up to 60 vol % of a feed to bypass up to 65 vol % of the hydroprocessing catalyst in a reactor.

U.S. Pat. No. 9,617,479 describes methods for hydroprocessing of triglycerides to form renewable diesel and propylene. The methods include exposing a triglyceride-containing feed to a catalyst containing a Group 6 metal and a non-noble Group 8-10 metal in the presence of 300 vppm to 7000 vppm (0.03 vol % to 0.7 vol %) of CO. The process is described as allowing a portion of the $C_3$ backbone carbon chains from the triglycerides to form propylene rather than propane in the final product slate. An example based on pilot scale data at 0.2 vol % CO is also described.

U.S. Pat. No. 9,464,238 describes methods for hydroprocessing of triglycerides to form renewable diesel. The methods include exposing a triglyceride-containing feed to a catalyst containing either a Group 6 metal or a non-noble Group 8-10 metal.

SUMMARY

In various aspects, methods are provided for performing hydrodeoxygenation. The methods include exposing a first portion of a feedstock having 1.0 wt % or more of oxygen to a first hydroprocessing catalyst in a first catalyst bed in the presence of a hydrogen-containing treat gas under first hydroprocessing conditions to form a first liquid product effluent having 0.5 wt % or less of oxygen and a first gas product effluent. The first portion of the feedstock can correspond to 5.0 wt % to 30 wt % of the feedstock. The method further includes cooling at least a portion of the first liquid product effluent. The method further includes exposing the cooled at least a portion of the first liquid product effluent, at least a portion of the first gas product effluent, and a second portion of the feedstock to a second hydroprocessing catalyst in a second catalyst bed under second hydroprocessing conditions to form a second liquid product effluent having 0.5 wt % or less of oxygen and a second gas product effluent. The method further includes cooling at least a portion of the second liquid product effluent. Additionally, the method includes exposing the cooled at least a portion of the second liquid product effluent, at least a portion of the second gas product effluent, and a remaining portion of the feedstock to at least one additional hydroprocessing catalyst in at least one additional catalyst bed under at least one additional hydroprocessing condition to form a final liquid product effluent having 0.5 wt % or less of oxygen and a final gas product effluent.

BRIEF DESCRIPTION OF THE DRAWINGS

FIG. 5 shows details from simulations of hydrodeoxygenation of a model feed based on a configuration similar to the configuration shown in FIG. 2.

FIG. 6 shows details from simulations of hydrodeoxygenation of a model feed based on a configuration similar to the configuration shown in FIG. 1.

DETAILED DESCRIPTION

Figure 1:
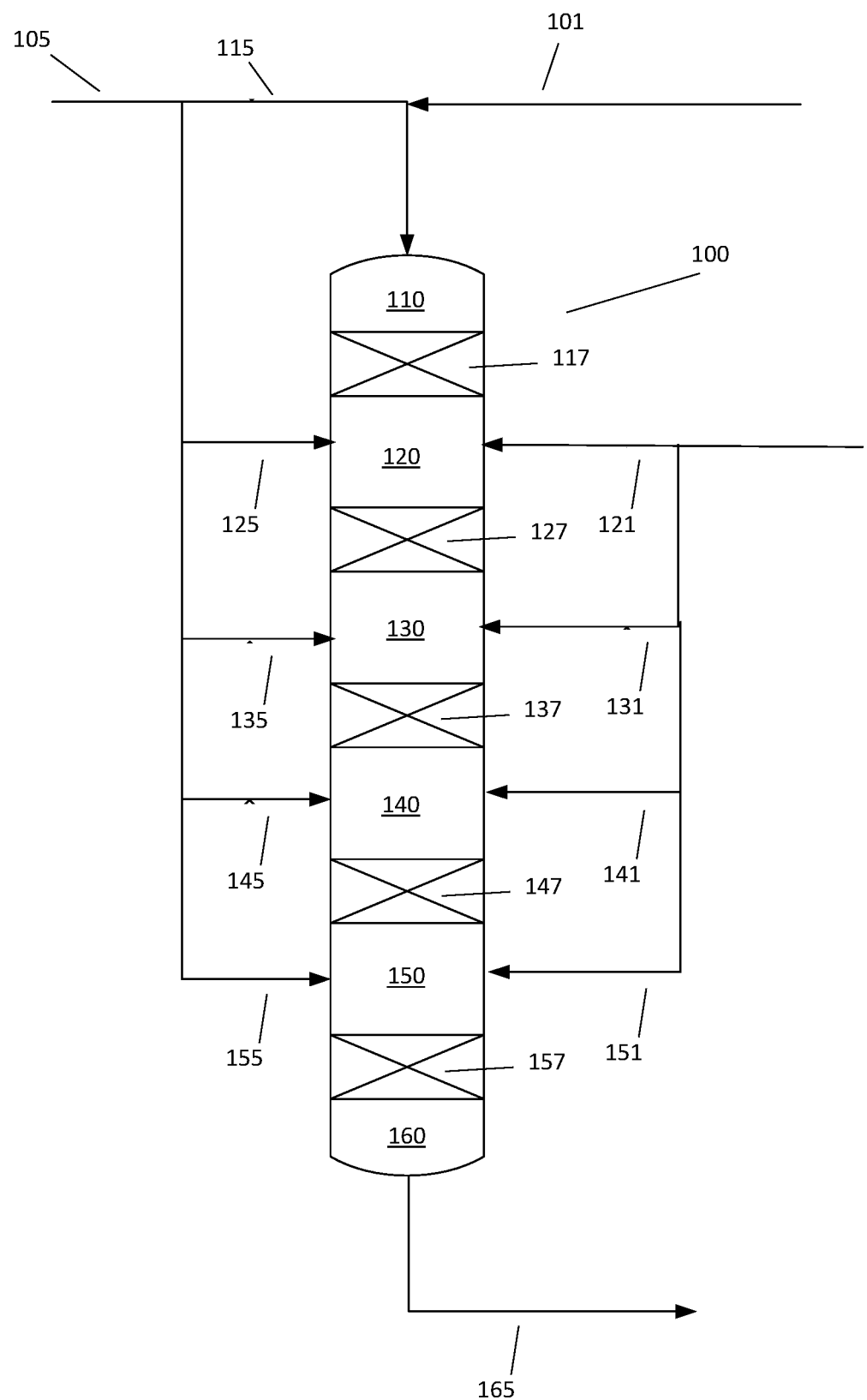
FIG. 1 shows an example of a configuration for maintaining a target temperature profile in a reactor while performing deoxygenation that includes hydrogen quench streams introduced into regions between catalyst beds.

All numerical values within the detailed description and the claims herein are modified by "about" or "approximately" the indicated value, and take into account experimental error and variations that would be expected by a person having ordinary skill in the art.

Overview

In various aspects, systems and methods are provided for hydroprocessing of bio-derived feeds, such as bio-oils and/or other types of feeds including triglycerides, fatty acids, and/or fatty acid derivatives. The systems and methods can assist with maintaining a desired temperature profile within a reactor while performing hydroprocessing on a feed with substantial oxygen content. In various aspects, the initial bed of the reactor can be exposed to 30 vol % or less of the total fresh feed. The remaining portions of the fresh feed can be introduced below one or more of the catalyst beds in the reactor. Optionally, relative to the volume percentage of the total fresh feed introduced into the region or volume above the initial catalyst bed, a higher volume percentage of the total fresh feed can be introduced into the reactor in one or more downstream regions. Optionally, the volume percentage of the total fresh feed introduced into a region can increase for at least two consecutive downstream regions, or at least three consecutive downstream regions. By reducing or minimizing the amount of fresh feed introduced upstream from the initial catalyst bed that contains a catalyst with hydrodeoxygenation activity, the net amount of product recycle can be reduced or minimized while still maintaining a target temperature profile across individual catalyst beds and/or across the reactor.

Conventionally, various configurations have been used to manage temperature and/or pressure within hydroprocessing reactors that include multiple catalyst beds. Such conventional configurations have a variety of common features. One typical feature is that the amount of fresh feed introduced into a volume upstream from the initial catalyst bed (i.e., feed introduced at a location where it is subsequently exposed to substantially all catalyst in the reactor) corresponds to 40 vol % or more of the total fresh feed introduced into the reactor.

Another typical feature is that the amount of feed introduced into a volume upstream from the initial catalyst bed is greater than the amount of feed introduced into any single volume corresponding to the volume between two catalyst beds.

The above conventional choices for reactor design are based in part on considerations related to removal of contaminants such as sulfur or nitrogen and/or considerations related to processes for cracking or isomerization of feedstocks. With regard to removal of sulfur and nitrogen, both sulfur and nitrogen typically occur in a variety of forms within mineral feedstocks. In order to achieve substantially complete removal, a significant residence time of feed being in contact with a fixed bed catalyst can be required. When a portion of the feed is bypassed around one or more catalyst beds, this bypass increases the likelihood of achieving less than complete removal of the sulfur and nitrogen. Thus, in conventional reactor design, it is typically not desirable to have substantial portions of a feed that bypass the initial catalyst bed.

Bio-derived feeds, such as feeds including bio-oils, triglycerides, fatty acids, and/or fatty acid derivatives, can pose different challenges in a hydroprocessing environment. Relative to the reaction conditions required for removal of sulfur and nitrogen, the conditions needed for hydrodeoxygenation can be milder, and the reaction rate for conversion of organic oxygen in a feedstock (i.e., oxygen that is part of a component that also contains carbon and hydrogen) to $H_2O$ can be substantially more rapid than the average rate for conversion of organic sulfur to $H_2S$ or conversion of organic nitrogen to $NH_3$. Thus, it is typical for a substantial majority of the oxygen in a feed to be removed when contacted with a catalyst bed, even though the amount of oxygen in a bio-derived feed is often greater than 1.0 wt %. This is in contrast to sulfur and/or nitrogen removal, where multiple catalyst beds (and/or large volume beds) are typically required when attempting to remove 1.0 wt % or more of sulfur and/or nitrogen. While the reaction rate for oxygen removal is higher, the heat released per oxygen converted to $H_2O$ is roughly comparable to the heat release per sulfur converted to $H_2S$ or the heat release per nitrogen converted to $NH_3$. As a result, removal of a 1.0 wt % or more of oxygen from a feed can be achieved in a catalyst volume corresponding to a substantially smaller thermal mass in comparison with the catalyst required for removing similar amounts of sulfur and/or nitrogen. Due to this ability to perform an exothermic reaction at a substantially higher rate, managing the heat generated during hydrodeoxygenation presents greater difficulties than managing the heat generated during hydrodesulfurization and/or hydrodenitrogenation for a typical mineral feed.

It is noted that the heat release during hydrodeoxygenation of a bio-derived feed can be further complicated by the additional heat that is released due to olefin saturation. Saturation of olefins is another reaction that can occur relatively rapidly under hydrodeoxygenation (or more generally hydroprocessing) type conditions. Some bio-derived feeds can have relatively high contents of olefins. The exothermic nature of olefin saturation means that still further heat can be generated in the relatively small catalyst volume where hydrodeoxygenation occurs for a feed containing a bio-derived portion.

Although hydrodeoxygenation can generate heat more rapidly than a hydrodesulfurization or hydrodenitrogenation process, it has been discovered that the more rapid reaction rate of hydrodeoxygenation can be converted to an advantage if an improved configuration of catalyst beds is used in a reactor. In various aspects, the heat generated during hydrodeoxygenation (including heat generated due to incidental olefin saturation) can be mitigated by processing a feed including a substantial oxygen content in a reactor so that a relatively small portion of the feed is exposed to the initial catalyst bed for hydrodeoxygenation. For example, the amount of fresh feed that is exposed to the initial catalyst bed can correspond to 5.0 wt % to 30 wt % of the total fresh feed that is introduced into the reactor, or 5.0 wt % to 20 wt %, or 10 wt % to 30 wt %, or 10 wt % to 25 wt %. Even though this means that 70 wt % or more of the fresh feed will bypass the initial hydrodeoxygenation catalyst bed, due to the relatively rapid rate of the hydrodeoxygenation reaction, concerns about incomplete hydrodeoxygenation (i.e., allowing more than 1.0 wt % oxygen to remain in the feed) can be reduced or minimized. This is in contrast to conventional configurations, where 40 wt % or more of the feed can be introduced above the initial catalyst bed of a reactor.

By exposing only a minor portion of the total fresh feed to the initial catalyst bed, the temperature rise across the initial catalyst bed can be managed to a target level. The resulting deoxygenated effluent from the first catalyst bed can then be at least partially passed into a second (or other subsequent) catalyst bed, along with additional fresh feed. Optionally, the temperature of the additional fresh feed can be controlled to achieve a target amount of quenching of the deoxygenated effluent from the first catalyst bed. The deoxygenated effluent from the first catalyst bed can serve as an additional diluent and/or heat transfer fluid in subsequent catalyst beds for performing deoxygenation.

Additionally or alternatively, one or more techniques can be used to further assist with managing the temperature in subsequent catalyst beds, such as using additional hydrogen treat gas as a quench gas between catalyst beds, using heat exchangers to further cool the deoxygenated effluent, and/or using product recycle streams. Depending on the aspect, only one type of heat management can be used, or a combination of two types of heat management, or all of the above types of heat management. In aspects where a product recycle stream is used as part of the heat management, the recycle stream can correspond to effluent from the hydrodeoxygenation reactor, effluent from a subsequent hydroprocessing stage (such as effluent from a subsequent catalytic dewaxing stage), or a combination thereof. It is noted that optimization of gas flows, fluid flows, and temperature management can also be performed to account for practical factors, such as equipment constraints or changes in the type and/or availability of input feed flows.

In various aspects, the systems and methods described herein can be used to manage the temperature profile within a hydrodeoxygenation reactor. This can correspond to managing the overall reactor temperature profile, managing the temperature profile across one or more catalyst beds, managing the temperature profile between one or more catalyst beds, or a combination thereof. In some aspects, the temperature profile across a catalyst bed can be managed so that the temperature difference between the top of the catalyst bed and the bottom of the catalyst bed is 108° F. or less (60° C. or less), or 99° F. or less (55° C. or less), or 90° F. or less (50° C. or less), or 72° F. or less (40° C. or less), or 54° F. or less (30° C. or less), such as down to 20° F. (~10° C.) or possibly still lower. Additionally or alternatively, cooling between catalyst beds can be used so that the difference between the temperature at the bottom of a first catalyst bed is greater than the temperature at the top of the next catalyst bed is 36° F. or more (20° C. or more), or 54° F. or more (30° C. or more), or 72° F. or more (40° C. or more), or 90° F. or more (50° C. or more), or 99° F. or more (55° C. or more), or 108° F. or more (60° C. or more), such as up to 126° F. (70° C.) or possibly still higher.

Another option for managing the temperature profile in a reactor can be to manage the weighted average bed temperature (WABT) for the various catalyst beds in the reactor. The WABT in a catalyst bed can be calculated based on the temperature at the top of the catalyst bed and the difference between the temperature at the top and bottom of the catalyst bed. In this discussion, the WABT is defined as $$WABT = T_i + 2/3(dT_i) \tag{1}$$

In Equation (1), $T_i$ is the temperature at the top of a catalyst bed "i". The value "$dT_i$" corresponds to the difference in temperature between the top and the bottom of the catalyst bed "i". It is noted that unless otherwise specified, the temperature at the bottom of a catalyst bed will be greater than the temperature at the top of a catalyst bed. Thus, $dT_i$ will generally be a positive number, and therefore the WABT will be greater than $T_i$.

In various aspects, the temperature within a reactor can be managed so that one or more (such as up to all) catalyst beds within the reactor have a WABT between 600° F. (316° C.) and 700° F. (371° C.), or between 316° C. and 680° F. (360° C.), or between 615° F. (324° C.) and 371° C., or between 324° C. and 360° C. Additionally or alternatively, the temperature within the reactor can be maintained so that the largest difference between WABT temperatures for catalyst beds within the reactor is 40° C. or less, or 30° C. or less, or 25° C. or less, or 20° C. or less, or 15° C. or less, such as down to all of the catalyst beds having substantially the same WABT (i.e., less than 5° C. variation between WABT values for different catalyst beds).

In addition to managing temperature profile of a catalyst bed and/or between catalyst beds, the temperature across the reactor can also be managed. In various aspects, the temperature profile across the reactor can be maintained so that the difference between the temperature at the top of the initial catalyst bed and the temperature at the bottom of the final catalyst bed is 144° F. or less (~80° C. or less), or 126° F. or less (70° C. or less), or 108° F. or less (60° C. or less), or 99° F. or less (55° C. or less), or 90° F. or less (50° C. or less), or 72° F. or less (40° C. or less), or 54° F. or less (30° C. or less), such as down to 20° F. (~10° C.) or possibly still lower. Additionally or alternatively, the temperature at the top of the initial catalyst bed can be 500° F. or more (260° C. or more), or 550° F. or more (288° C. or more), or 600° F. or more (316° C. or more), or 625° F. or more (329° C. or more), or 650° C. or more (343° C. or more), or 675° F. or more (357° C. or more), or 700° F. or more (371° C. or more), such as up to 750° F. (399° C.) or possibly still higher. Further additionally or alternatively, the temperature at the bottom of the final catalyst bed can be 850° F. or less (454° C. or less), or 825° F. or less (441° C. or less), or 800° F. or less (427° C. or less), or 775° F. or less (413° C. or less), or 750° C. or less (399° C. or less), or 725° F. or less (385° C. or less), or 700° C. or less (371° C. or less), such as down to 650° F. (343° C.) or possibly still lower.

Some examples of strategies for implementing the above temperature profiles can include, but are not limited to: having roughly the same temperature at the top of each catalyst bed that receives fresh feed; having roughly the same weighted average bed temperature for each catalyst bed that receives fresh feed; having roughly the same outlet temperature for each catalyst bed that receives fresh feed; and/or having an ascending temperature profile, so that a temperature for each successive bed (e.g., temperature at top of bed, temperature at bottom of bed) is equal to or greater than the temperature for the same location of the prior bed.

Because only a minor portion of the total fresh feed is introduced into the reactor upstream from the initial deoxygenation catalyst bed, in some aspects an unexpected distribution of how fresh feed is introduced into the reactor can be achieved. In some aspects, the volume percentage of fresh feed (relative to total fresh feed) introduced upstream from the initial catalyst bed can be smaller than the volume percentage of fresh feed introduced into the volume between two catalyst beds. As an example of this, one option can be to introduced 25 vol % of the fresh feed upstream from the first catalyst bed, 30 vol % of the fresh feed between the first catalyst bed and the second catalyst bed, 35 vol % of the fresh feed between the second catalyst and the third catalyst bed, and the remaining fresh feed can be introduced between the third catalyst bed and a fourth catalyst bed. In this type of example, the amount of fresh feed introduced above the first catalyst bed is smaller than the amount of fresh feed introduced between the first catalyst bed and the second catalyst bed. As a variation on this, the amount of fresh feed introduced into a region can increase for two or more consecutive regions in the downstream direction, or three or more consecutive regions. Because portions (up to substantially all) of the deoxygenated effluent from the upstream catalyst beds are passed through the downstream catalyst beds, the additional diluent and/or heat transfer fluid benefits of the deoxygenated effluent can allow higher percentages of fresh feed to be processed in downstream catalyst beds.

It is noted that optimization can be used to adjust various aspects of the methods and systems described herein in order to achieve target catalyst bed temperatures and/or target temperature differentials across one or more catalyst beds. Such optimization can include, but is not limited to, modification/optimization of the distribution of feed above the various catalyst beds; modification/optimization of catalyst (s) within one or more catalyst beds; modification/optimization of the heat management method(s) used for cooling effluent exiting from a catalyst bed; or a combination thereof.

In some aspects, all or substantially all (i.e., 99 wt % or more) of the effluent from a catalyst bed can be cascaded into the region above a subsequent catalyst bed. In other aspects, a portion of the effluent can be withdrawn, such as to allow the effluent to pass through an external heat exchanger.

Definitions

In this discussion, reference is made to "regions". A region is defined herein as a volume within a reactor, such as a fixed bed reactor. The regions are defined based on the locations of the beginning of the reactor, the end of the reactor, and the top of each catalyst bed within the reactor. As an example, the regions within a reactor can be identified starting at the top or beginning of the reactor, relative to the direction of liquid feed flow within the reactor. The initial or first region in a reactor, relative to the direction of flow for liquid feed, corresponds to all of the volume upstream from the top of the first catalyst bed. The next region in the reactor corresponds to the volume between the top of the first catalyst bed and the top of the next catalyst bed, or the end of the reactor if there is only one catalyst bed in the reactor.

Additional regions can be similarly identified until the end of the reactor is reached. Thus, a reactor containing "n" catalyst beds will contain "n+1" regions under this definition. It is noted that the first or initial catalyst region in a reactor is the only region in a reactor that does not include a catalyst bed as part of the volume of the region. In some optional aspects, any volume within a catalyst bed can be excluded from the volume of the regions within a reactor. In such aspects, the regions downstream from the first or initial region correspond to the volume between catalyst beds or the volume between the final catalyst bed in the reactor and the end of the reactor.

In this discussion a "liquid product effluent" from a hydroprocessing reaction is defined as the portion of a hydroprocessing effluent that would be a liquid at 20° C. and 100 kPa-a. In this discussion, a "gas product effluent" from a hydroprocessing reaction is defined as the portion of a hydroprocessing effluent that would be a gas at 20° C. and 100 kPa-a. It is noted that hydroprocessing is typically performed at temperatures substantially above 20° C., so that the "liquid product effluent" may be at least partially (such as up to fully) in the gas phase when formed.

In this discussion, the sulfur content of a fraction can be determined according to ASTM D2622. The nitrogen content of a fraction can be determined according to ASTM D4629. The olefin content of a fraction can be determined by NMR. The oxygen content of a fraction can be determined by reductive pyrolysis.

References to a periodic table, such as references to the Group number of a metal, are defined herein as references to the current version of the IUPAC periodic table.

Configuration Examples

FIGS. 1-4 show various examples of reactor configurations for performing hydrodeoxygenation of a bio-derived feed. It is noted that the configurations in FIGS. 1-4 are examples, and various combinations of the configurations shown in FIGS. 1-4 could also be used. For example, it is noted that the configuration shown in FIG. 3 could be understood as an example of combining a portion of the configuration shown in FIG. 1 with the configuration shown in FIG. 2.

FIG. 1 shows an example of a reactor configuration where heat management is performed at least in part by reducing or minimizing the volume of fresh feed introduced prior to the initial catalyst bed and by distributing the introduction of hydrogen treat gas so that the hydrogen treat gas can also serve as a quench gas between catalyst beds. In the configuration shown in FIG. 1, five catalyst beds are shown, but it is understood that any convenient number of catalyst beds can be included in a reactor.

Using a hydrogen quench gas to provide cooling of effluent between catalyst beds can provide various advantages. In particular, using a hydrogen quench gas can reduce, minimize, or eliminate the need for substantial product recycle in order to maintain a target temperature profile. It is noted that the addition of hydrogen quench gas may increase the overall treat gas rate of hydrogen for the reactor. In such aspects, use of hydrogen as a quench gas can result in an increase in the size of the recycle gas compressor.

In FIG. 1, reactor 100 includes initial catalyst bed 117, second catalyst bed 127, third catalyst bed 137, fourth catalyst bed 147, and fifth catalyst bed 157. Because the reactor includes five catalyst beds, the volume of the reactor can be viewed as being divided into six regions. Region 110 corresponds to the volume above the initial catalyst bed 117. Region 120 corresponds to at least the volume between initial catalyst bed 117 and second catalyst bed 127. Optionally, region 120 can further extend up to the top of initial catalyst bed 117. Region 130 corresponds to at least the volume between second catalyst bed 127 and third catalyst bed 137. Optionally, region 130 can further extend up to the top of second catalyst bed 127. Region 140 corresponds to at least the volume between third catalyst bed 137 and fourth catalyst bed 172.

Optionally, region 140 can further extend up to the top of third catalyst bed 137. Region 150 corresponds to at least the volume between fourth catalyst bed 147 and fifth catalyst bed 157. Optionally, region 150 can further extend up to the top of fourth catalyst bed 147. Finally, region 160 corresponds to at least the volume between catalyst bed 157 and the bottom of reactor 100. Optionally, region 160 can further extend up to the top of catalyst bed 157.

In the configuration shown in FIG. 1, a plurality of conduits are available for introducing fresh feed into the various regions of the reactor. Although FIG. 1 shows a single conduit for introducing fresh feed into each region, it is understood that any convenient number of conduits can be used and that the number of conduits used to provide fresh feed to a region can vary. In the configuration shown in FIG. 1, portions of fresh feed 105 can be delivered to the various regions. A first portion 115 of fresh feed 105 can be delivered to region 110. A second portion 125 of fresh feed 105 can be delivered to region 120. A third portion 135 of fresh feed 105 can be delivered to region 130. A fourth portion 145 of fresh feed 105 can be delivered to region 140. A fifth portion 155 of fresh feed 105 can be delivered to region 150. It is noted that fresh feed is not delivered to region 160 in the example configuration shown in FIG. 1. In the example shown in FIG. 1, first portion 115 corresponds to 10 vol % of fresh feed, 105, second portion 125 corresponds to 15 vol % of fresh feed 105, third portion 135 corresponds to 20 vol % of fresh feed 105, fourth portion 145 corresponds to 25 vol % of fresh feed 105, and fifth portion 150 corresponds to 30 vol % of fresh feed 105. In other aspects, any convenient amount of fresh feed can be delivered into each region, with the optional constraint that the initial region receives 5.0 vol % to 30 vol % of the total fresh feed. It is noted that in the configuration shown in FIG. 1, the volume percentage of fresh feed (relative to the total fresh feed) increases for each downstream region.

As a variation on FIG. 1, it is noted that one or more supplemental catalyst beds could be included in the reactor, so that one or more supplemental catalyst beds are present between catalyst bed 157 and the bottom of the reactor. In this type of aspect, little or no fresh feed would be introduced in any region above a supplemental catalyst bed. For example, the amount of fresh feed introduced in a region above a supplemental catalyst bed can correspond to 0.0 wt % to 3.0 wt % of the fresh feed, or 0.0 wt % to 1.0 wt %, or 0.1 wt % to 3.0 wt %, or 0.1 wt % to 1.0 wt %. Instead, the supplemental catalyst bed(s) would allow any unreacted feed exiting from the bottom of catalyst bed 157 to be reacted in the one or more supplemental beds. More generally, in various aspects, one or more supplemental catalyst beds can optionally be included in a reactor. Supplemental catalyst beds are defined as catalyst beds where no additional fresh feed is added in the region above the catalyst bed. Instead, supplemental catalyst beds receive at least a portion of the effluent exiting from the preceding catalyst bed and/or receive recycled product.

During operation of a reactor performing hydrodeoxygenation, the temperature across a catalyst bed can increase. While the distribution of fresh feed shown in FIG. 1 can mitigate this temperature increase, it can also be beneficial to reduce the temperature of the effluent from one catalyst bed prior to introducing that effluent into the next catalyst bed. To assist with temperature management, the configuration shown in FIG. 1 provides additional hydrogen treat gas as a quench gas between catalyst beds.

In the configuration shown in FIG. 1, an initial portion of hydrogen treat gas 101 is introduced into region 110 of reactor 100. In some aspects, initial portion of hydrogen treat gas 101 can correspond to full amount of treat gas desired for performing hydrodeoxygenation (and/or other hydroprocessing reactions within the catalyst beds). For example, if the target amount of hydrogen treat gas for the reactor is to have an amount of hydrogen that is at least four times the (expected) hydrogen consumption within the reactor, then initial portion of hydrogen treat gas 101 can include an amount of hydrogen corresponding to four times the hydrogen consumption within the reactor. In such aspects, any hydrogen included in quench gas streams 121, 131, 141, and 151 can correspond to additional hydrogen above the target amount. In such aspects, because the full target amount of hydrogen is satisfied by initial portion of hydrogen treat gas 101, the volume of quench gas streams 121, 131, 141, and 151 can be adjusted as needed based on a target temperature profile, without needing to worry about whether sufficient hydrogen is present for hydrodeoxygenation. In other aspects, the hydrogen provided by hydrogen quench gas stream 121, hydrogen quench gas stream 131, hydrogen quench gas stream 141, and/or hydrogen quench gas stream 151 can correspond to a portion of the hydrogen that contributes to achieving the target amount of hydrogen treat gas. In such aspects, one or more of quench gas streams 121, 131, 141, and 151 can be used to contribute to the target amount of hydrogen, such as a plurality of the quench gas streams, or possibly all of the quench gas streams.

During operation of a configuration such as the configuration shown in FIG. 1, fresh feed 105 is introduced into regions 110, 120, 130, 140, and 150 of reactor 100, as portions 115, 125, 135, 145, and 155, respectively. Initial portion of hydrogen treat gas 101 is also introduced into region 110. Fresh feed portion 115 contacts catalyst bed 117 in the presence of initial portion of hydrogen treat gas 101. The resulting hydrodeoxygenated effluent from catalyst bed 117 passes into region 120, where it is partially quenched by quench gas 121. Some quenching can also be performed by fresh feed portion 125. The combined hydrodeoxygenated effluent and fresh feed portion 125 can then be exposed to catalyst bed 127 in the presence of the remaining hydrogen from initial portion of hydrogen treat gas 101 and the hydrogen included in quench gas 121. This forms a hydrodeoxygenated effluent that passes into region 130, where it is partially quenched by quench gas 131. Some quenching can also be performed by fresh feed portion 135. The combined hydrodeoxygenated effluent and fresh feed portion 135 can then be exposed to catalyst bed 137 in the presence of the remaining hydrogen from initial portion of hydrogen treat gas 101 and the hydrogen included in quench gas 131. This process can be continued with hydrodeoxygenation in catalyst bed 147 and catalyst bed 157, resulting in a hydrodeoxygenated effluent that is passed into region 160 that is the result of hydrodeoxygenation of substantially all of fresh feed 105. This effluent can exit from the reactor as total effluent 165.

Figure 2:
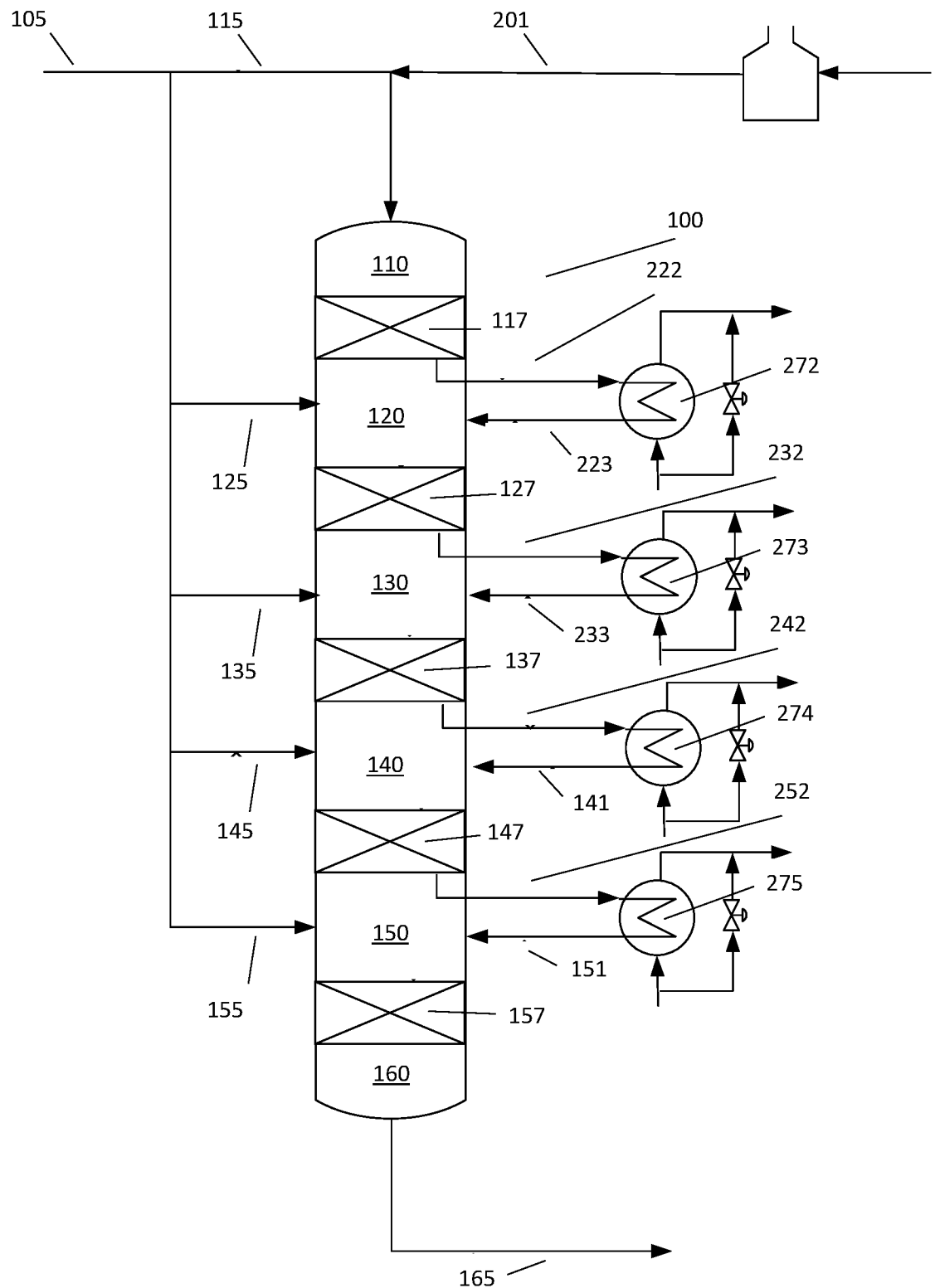
FIG. 2 shows an example of a configuration for maintaining a target temperature profile in a reactor while performing deoxygenation that includes using heat exchangers to cool the effluent between catalyst beds.

FIG. 2 shows another example of a configuration, but instead of using (hydrogen-containing) quench gas, additional cooling between catalyst beds is provided by using heat exchangers to cool the effluent between stages. This heat exchange can be performed in any convenient manner. In the example configuration shown in FIG. 2, heat exchangers external to the reactor are shown, but heat exchangers that are at least partially contained within the reactor (such as within a region in the reactor) can be used. At least a portion of the effluent exiting from a catalyst bed can be passed into the heat exchanger, such as up to substantially all of such effluent. Optionally, at least a portion of the fresh feed introduced into a region can be included in the flow that passes through a heat exchanger.

Using heat exchangers to provide cooling of effluent between catalyst beds can provide various advantages. In particular, using heat exchangers can reduce, minimize, or eliminate the need for substantial product recycle in order to maintain a target temperature profile. Additionally, using heat exchangers can reduce or minimize hydrogen consumption relative to aspects where a hydrogen quench gas is used for cooling between catalyst beds.

In the configuration shown in FIG. 2, five catalyst beds are shown, but it is understood that any convenient number of catalyst beds can be included in a reactor. Because there are five catalyst beds shown in FIG. 2, the catalyst beds and regions shown in FIG. 2 have the same reference numerals as shown in FIG. 1. However, it is understood that there does not necessarily have to be any correlation between the catalyst beds and/or regions shown in FIG. 1 and FIG. 2. The similar numbering is used only for convenience in describing the configuration shown in FIG. 2.

During operation of a configuration such as the configuration shown in FIG. 2, fresh feed 105 is introduced into regions 110, 120, 130, 140, and 150 of reactor 100, as portions 115, 125, 135, 145, and 155, respectively. Hydrogen treat gas 201 is also introduced into region 110. Fresh feed portion 115 contacts catalyst bed 117 in the presence of hydrogen treat gas 201. In the example configuration shown in FIG. 2, at least a portion 222 of the resulting hydrodeoxygenated effluent from catalyst bed 117 can be passed into heat exchanger 272 to form a quenched effluent portion 223. Some quenching can also be performed by fresh feed portion 125. The combined quenched effluent 223, fresh feed portion 125, and any remaining hydrodeoxygenated effluent that did not enter heat exchanger 272 can then be exposed to catalyst bed 127 in the presence of the remaining hydrogen from hydrogen treat gas 201. In the example configuration shown in FIG. 2, at least a portion 232 of the resulting hydrodeoxygenated effluent from catalyst bed 127 passed into heat exchanger 273 to form a quenched effluent portion 233. Some quenching can also be performed by fresh feed portion 135. The combined quenched effluent 233, fresh feed portion 135, and any remaining hydrodeoxygenated effluent that did not enter heat exchanger 273 can then be exposed to catalyst bed 137 in the presence of the remaining hydrogen from hydrogen treat gas 201. In a similar manner, heat exchanger 274 can be used to cool at least a portion 242 of the hydrodeoxygenated effluent from catalyst bed 137 to form quenched effluent portion 243, and heat exchanger 275 can be used to cool at least a portion 252 of the hydrodeoxygenated effluent from catalyst bed 147 to form a quenched effluent portion 253.

The heat exchangers 272, 273, 274, and 275 can optionally be used for heating of other streams associated with the reactor 100 and/or heating of other streams for nearby processes. For example, one or more of heat exchangers 272, 273, 274, and 275 could be used for pre-heating of fresh feed 105, or for pre-heating of one or more of fresh feed portions 115, 125, 135, 145, and 155. As another example, one or more of heat exchangers 272, 273, 274, and 275 could be integrated with an additional refinery process to allow for heating of flows associated with the additional refinery process and/or generation of steam at any pressure that is thermodynamically feasible.

Figure 3:
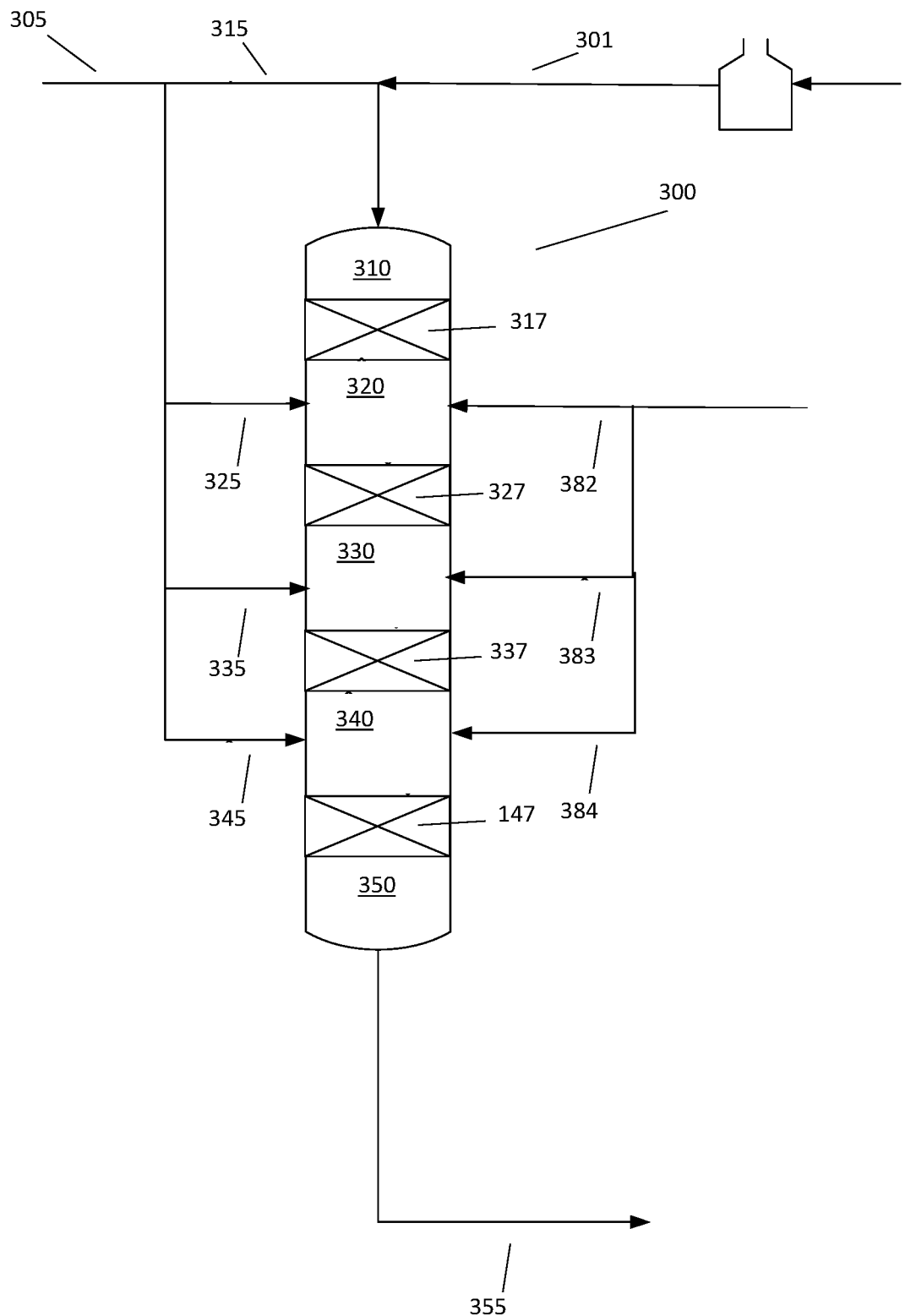
FIG. 3 shows an example of a configuration for maintaining a target temperature profile in a reactor while performing deoxygenation that includes recycle streams introduced into regions between catalyst beds.

FIG. 3 shows still another example of a configuration. In FIG. 3, recycle streams of hydrodeoxygenated effluent are used as quench streams for the various regions. The reactor shown in FIG. 3 includes four catalyst beds rather than five, but more generally any convenient number of catalyst beds could be included.

Using product recycle to provide cooling of effluent between catalyst beds can provide various advantages. For example, using product recycle can reduce or minimize hydrogen consumption relative to aspects where a hydrogen quench gas is used for cooling between catalyst beds. This can allow for a corresponding decrease in recycle compressor size as well as a corresponding decrease in power requirements.

In the configuration shown in FIG. 3, a reactor 300 is shown that includes catalyst bed 317, catalyst bed 327, catalyst bed 337, and catalyst bed 347. This results in reactor 300 including a region 310, a region 320, a region 330, a region 340, and a region 350. In the example shown in FIG. 3, hydrogen treat gas 301 provides hydrogen for performing hydrodeoxygenation reactions.

In FIG. 3, fresh feed 305 is split into fresh feed portion 315, fresh feed portion 325, fresh feed portion 335, and fresh feed portion 345. As an example of a potential division between the feed portions, fresh feed portion 315 can correspond to 10 vol % of fresh feed 305, fresh feed portion 325 can correspond to 20 vol % of fresh feed 305, fresh feed portion 335 can correspond to 30 vol % of fresh feed 305, and fresh feed portion 345 can correspond to 40 vol % of fresh feed 305. In other aspects, any convenient division of fresh feed 305 between the various fresh feed portions can be used.

In the configuration shown in FIG. 3, recycle stream 382 is used as a quench flow for region 320, recycle stream 383 is used as a quench flow for region 330, and recycle stream 384 is used as a quench flow for region 340. Optionally, any convenient number of recycle streams can be used that are introduced into any convenient combination of the regions. Optionally, one or more recycle flows could be introduced into region 310 and/or region 350.

Optionally, one or more regions can operate without introduction of a recycle stream. In the configuration shown in FIG. 3, recycle streams 382, 383, and 384 can correspond to recycled portions of the final hydrodeoxygenated effluent 355 that exits from the bottom of reactor 300. The recycle streams can correspond to a recycled portion of the total hydrodeoxygenated effluent, or one or more separations can be performed on the final hydrodeoxygenated effluent 355 prior to forming the recycle streams.

Figure 4:
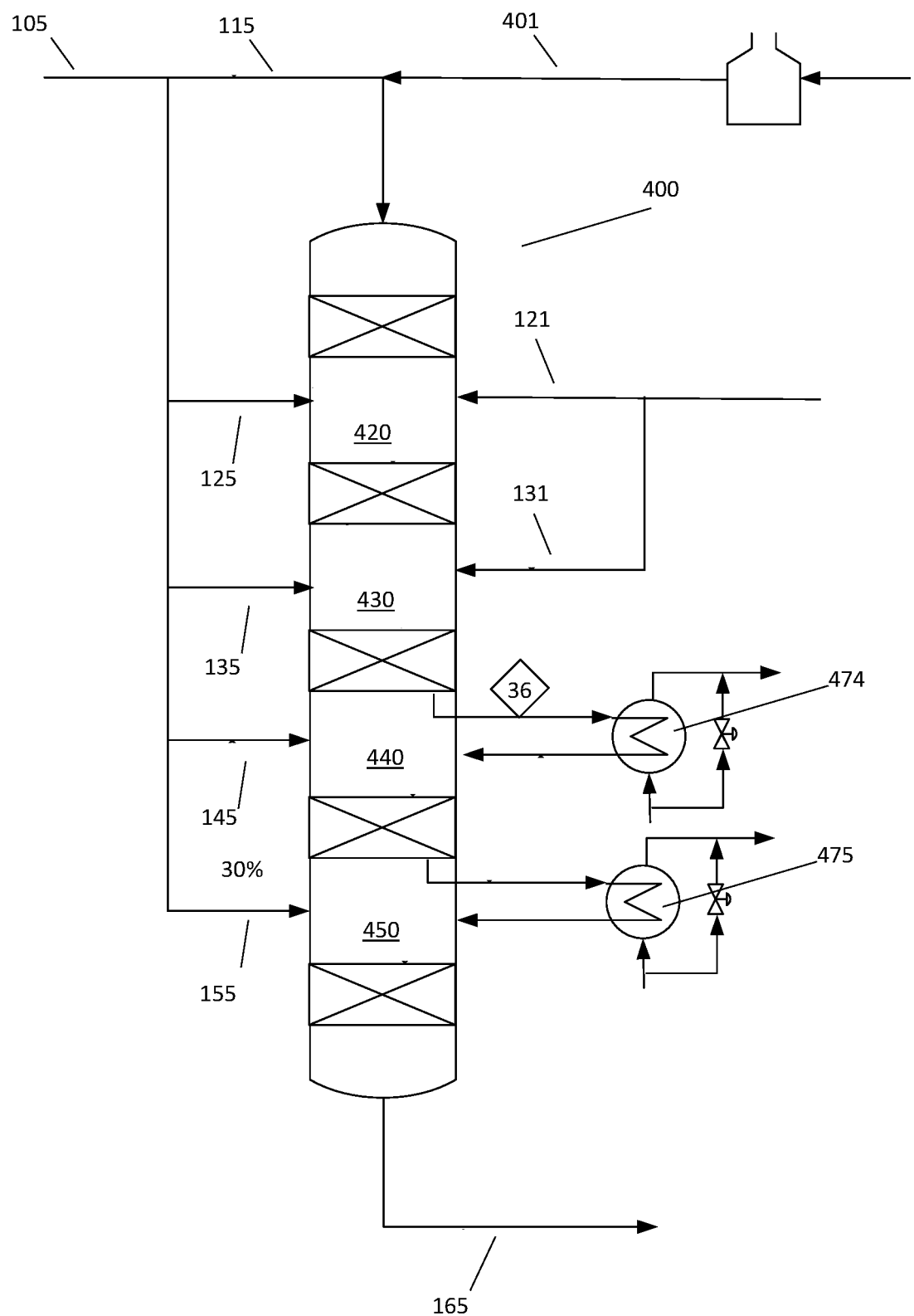
FIG. 4 shows an example of a configuration for maintaining a target temperature profile in a reactor while performing deoxygenation that includes a combination of heat exchangers and hydrogen quench streams.

FIG. 4 shows an example of how the concepts illustrated in FIG. 1 and FIG. 2 can be combined to form yet another type of configuration. In FIG. 4, a reactor 400 is shown that uses quench gas 421 and quench gas 431 to provide additional cooling for hydrodeoxygenated effluent in regions 420 and 430, respectively, of reactor 400. Heat exchanger 474 and heat exchanger 475 are then used to provide additional cooling for hydrodeoxygenated effluent in regions 440 and 450, respectively, of reactor 400. It is noted that although the quench gas flows and heat exchangers shown in FIG. 4 are applied to separate regions, in other aspects any convenient combination of quench gas flows, heat exchangers, and/or recycle streams can be used to provide supplemental cooling in a given region. More generally, any convenient combination of quench gas flows, heat exchangers, and/or recycle streams can be used to provide supplemental cooling to the various regions in a reactor. In the example shown in FIG. 4, hydrogen treat gas 401 provides hydrogen for performing hydrodeoxygenation reactions.

Feedstock for Hydrodeoxygenation

In various aspects, a feedstock for hydrodeoxygenation can correspond to a feed derived from a biological source. In this discussion, a feed derived from a biological source refers to a feedstock derived from a biological raw material component, such as vegetable fats/oils or animal fats/oils, fish oils, pyrolysis oils, and algae lipids/oils, as well as components of such materials, and in some embodiments can specifically include one or more types of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Algae oils or lipids can typically be contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 40 wt % of lipids, based on total weight of the biomass itself.

Vegetable fats/oils, animal fats/oils, fish oils, pyrolysis oils, and/or algae lipids/oils as referred to herein can also include processed material. Non-limiting examples of processed vegetable, animal (including fish), and algae material include fatty acids and fatty acid alkyl esters. Alkyl esters typically include $C_1$-$C_5$ alkyl esters of fatty acids. One or more of methyl, ethyl, and propyl esters are preferred.

Other bio-derived feeds usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 10 to 22 carbons or 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure corresponding to a reaction product of glycerol and three fatty acids. Although a triglyceride is described herein as having side chains corresponding to fatty acids, it should be understood that the fatty acid component does not necessarily contain a carboxylic acid hydrogen. Other types of feed that are derived from biological raw material components can include fatty acid esters, such as fatty acid alkyl esters (e.g., FAME and/or FAEE).

A feed derived from a biological source can have a wide range of nitrogen and/or sulfur contents. For example, a feedstock based on a vegetable oil source can contain up to 300 wppm nitrogen. In contrast, a biomass based feedstream containing whole or ruptured algae can sometimes include a higher nitrogen content. Depending on the type of algae, the nitrogen content of an algae based feedstream can be at least 2 wt %, for example at least 3 wt %, at least 5 wt %, such as up to 10 wt % or possibly still higher. The sulfur content of a feed derived from a biological source can also vary. In some aspects, the sulfur content can be 1000 wppm or less, or 500 wppm or less, or 200 wppm or less, or 100 wppm or less, or 50 wppm or less, such as down to being substantially free of sulfur (1.0 wppm or less).

Aside from nitrogen and sulfur, oxygen can be another heteroatom component in feeds derived from a biological source. For example, a feed derived from a biological source, prior to hydrodeoxygenation, can include 1.0 wt % to 20 wt % of oxygen, or 1.0 wt % to 12 wt %, or 3.0 wt % to 20 wt %, or 3.0 wt % to 12 wt %, or 4.0 wt % to 20 wt %, or 4.0 wt % to 12 wt %.

In some aspects, a portion of a mineral feedstock can be co-processed with a feed derived from a biological source. A mineral feedstock refers to a conventional feedstock, typically derived from crude oil and that has optionally been subjected to one or more separation and/or other refining processes. As an example, the mineral feedstock can be a petroleum feedstock boiling in the diesel range or above. Examples of suitable feedstocks can include, but are not limited to, virgin distillates, hydrotreated virgin distillates, kerosene, naphtha, diesel boiling range feeds (such as hydrotreated diesel boiling range feeds), light cycle oils, atmospheric gasoils, and the like, and combinations thereof. The amount of mineral feedstock blended with a feed derived from a biological source can correspond to 1.0 wt % to 50 wt % of the weight of the blended feedstock, or 1.0 wt % to 30 wt %, or 1.0 wt % to 20 wt %, or 10 wt % to 50 wt %, or 10 wt % to 30 wt %.

Mineral feedstocks for blending with a bio-derived can be relatively free of nitrogen (such as a previously hydrotreated feedstock) or can have a nitrogen content from about 1 wppm to about 2000 wppm nitrogen, for example from about 50 wppm to about 1500 wppm or from about 75 to about 1000 wppm. In some embodiments, the mineral feedstock can have a sulfur content from about 1 wppm to about 10,000 wppm sulfur, for example from about 10 wppm to about 5,000 wppm or from about 100 wppm to about 2,500 wppm. In various aspects, the combined feed can have an oxygen content of 1.0 wt % or more, such as 1.0 wt % to 15 wt %.

The content of sulfur, nitrogen, oxygen, and olefins in a feedstock created by blending two or more feedstocks can typically be determined using a weighted average based on the blended feeds. For example, a mineral feed and a bio-derived feed can be blended in a ratio of 20 wt % mineral feed and 80 wt % bio-derived feed. If the mineral feed has a sulfur content of about 1000 wppm, and the bio-derived feed has a sulfur content of about 10 wppm, the resulting blended feed could be expected to have a sulfur content of about 208 wppm.

Hydrodeoxygenation

Generally, any type of reaction condition suitable for performing hydroprocessing on a feedstock can be used to perform hydrodeoxygenation. Thus, combinations of catalyst and processing conditions suitable for performing hydrotreating, catalytic dewaxing, hydrocracking, and/or aromatic saturation can be suitable for performing hydrodeoxygenation of a feed. Additionally, some milder conditions can also be suitable for performing hydrodeoxygenation. This can include, for example, performing hydroprocessing in the presence of a catalyst that includes only a Group 6 or only a non-noble Group 8-10 metal.

In various aspects, a feed having an oxygen content of 1.0 wt % or more can be exposed to hydroprocessing conditions in a hydroprocessing stage. A hydroprocessing stage can include one or more reactors, with each reactor optionally including one or more catalyst beds. The catalyst beds within a reactor can include similar catalysts or different catalysts, depending on the configuration. Exposing a feed having an oxygen content of 1.0 wt % or more to hydroprocessing conditions can result in hydrodeoxygenation of the feed.

As an example, in some aspects a hydroprocessing stage can correspond to a stage for conversion of a feed including a substantial portion of vegetable oil into a renewable diesel fuel or fuel blending product. Some types of bio-oil can correspond to soybean oil, canola oil, and/or other types of oils corresponding to a primary bio-oil product. In such aspects, the bio-oil can optionally have a triglyceride content of 40 wt % or more, or 60 wt % or more, or 80 wt % or more, such as up to being substantially composed of triglycerides. Other types of bio-oils can correspond to oils such as the corn oil that is formed as a secondary product during ethanol production from corn biomass.

In this type of example, a hydroprocessing stage for conversion of vegetable oil into renewable diesel can involve two types of hydroprocessing. A first type of hydroprocessing can correspond to hydrodeoxygenation of the feed. After hydrodeoxygenation, additional cracking and/or catalytic dewaxing can be performed on the hydrodeoxygenated feed to improve one or more properties of the final fuel or fuel blending product. It is noted that both hydrodeoxygenation and the additional cracking and/or catalytic dewaxing can occur at the same time. However, due to the relatively rapid rate for hydrodeoxygenation under conditions suitable for cracking and/or dewaxing, at least a portion of the cracking and/or catalytic dewaxing can typically occur after hydrodeoxygenation has been substantially completed.

Some examples of hydrodeoxygenation catalysts can correspond to hydrotreating catalysts. In some aspects, a catalyst can be used that includes a Group 6 metal on a support material, but less than 1.0 wt % of a Group 8 metal. In other aspects, conventional hydrotreating catalysts that include both a Group 6 metal and a Group 8 metal on a support material can be used. The at least one Group 6 metal, in oxide form, can typically be present in an amount ranging from 2.0 wt % to 40 wt %, relative to a total weight of the catalyst, or 6.0 wt % to 40 wt %, or 10 wt % to 30 wt %. When a Group 8-10 metal is also present, the at least one Group 8-10 metal, in oxide form, can typically be present in an amount ranging from 2.0 wt % to 40 wt %, preferably for supported catalysts from 2.0 wt % to 20 wt % or from 4.0 wt % to 15 wt %.

Typical effective conditions for processing a feedstock containing triglycerides, fatty acid alkyl esters, fatty acids, and/or fatty acid derivatives (and/or other oxygen-containing bio-derived feeds) to remove oxygen can include a hydrogen partial pressure of 200 psig (1.4 MPag) to 1200 psig (8.3 MPag).

The hydrodeoxygenation conditions can also include a temperature, a hydrogen treat gas rate, and a liquid hourly space velocity (LHSV). Suitable effective temperatures can be from 230° C. to 375° C., or 250° C. to 350° C. The LHSV can be from 0.1 h$^{-1}$ to 10 hr$^{-1}$, or from 0.2 hr$^{-1}$ to 5.0 hr$^{-1}$. The hydrogen treat gas rate can be any convenient value that provides sufficient hydrogen for deoxygenation of a feedstock. Typical values can range from 500 scf/B (84 Nm$^3$/m$^3$) to 10,000 scf/B (1685 Nm$^3$/m$^3$). One option for selecting a treat gas rate can be to select a rate based on the expected stoichiometric amount of hydrogen for complete deoxygenation of the feedstock. Another option can be to select a hydrogen treat gas rate based on the total expected hydrogen need for all hydroprocessing reactions that are expected to occur. This can include hydrodeoxygenation as well as potentially some olefin saturation, hydrodesulfurization, hydrodenitrogenation, and/or aromatic saturation. As an example, many types of feeds derived from biological sources have a stoichiometric hydrogen need for deoxygenation of between 200 scf/B (34 Nm$^3$/m$^3$) to 5000 scf/B (~850 Nm$^3$/m$^3$). In some aspects, the hydrogen treat gas rate can be selected based on a multiple of the stoichiometric hydrogen need, such as at least 1 times the hydrogen need, or at least 1.5 times the hydrogen need, or at least 2 times the hydrogen need, or at least 4 times the hydrogen need, such as up to 10 times the hydrogen need or possibly still higher. In other aspects where at least a portion of the gas phase deoxygenation effluent is recycled, any convenient amount of hydrogen relative to the stoichiometric need can be used.

The hydrodeoxygenation conditions for can be suitable for reducing the oxygen content of the feed to 1.0 wt % or less, or 0.5 wt % or less, such as down to having substantially no oxygen (0.1 wt % or less). Although the stoichiometric hydrogen need is calculated based on complete deoxygenation, reducing the oxygen content to substantially zero is typically not required to allow further processing of the deoxygenated feed in conventional equipment.

In some aspects, the hydrodeoxygenated effluent (or at least a portion thereof) can then be catalytically dewaxed in order to improve the cold flow properties of the distillate boiling range portion of the effluent. Additionally or alternately, a portion of the hydrodeoxygenation can be performed in the presence of a catalytic dewaxing catalyst under catalytic dewaxing conditions. Fatty acid carbon chains often correspond to unbranched carbon chains. After deoxygenation, such unbranched carbon chains can often have relatively poor cold flow properties, such as relatively high pour points, cloud points, or cold filter plugging points. In applications where it is desired to use the distillate boiling range portion of the effluent as part of a diesel fuel, it can be desirable to expose a distillate boiling range product to a dewaxing catalyst under dewaxing conditions in order to improve the cold flow properties.

Dewaxing catalysts can include molecular sieves such as crystalline aluminosilicates (zeolites). More generally, dewaxing catalysts can correspond to catalysts having a zeotype framework. The dewaxing catalyst can optionally be a supported catalyst, such as a catalyst including a zeotype framework and a binder material. In an embodiment, the zeotype framework can comprise, consist essentially of, or be ZSM-5, ZSM-22, ZSM-23, ZSM-35, ZSM-48, zeolite Beta, or a combination thereof, for example ZSM-23 and/or ZSM-48, or ZSM-48 and/or zeolite Beta. Optionally but preferably, zeotype frameworks that are selective for dewaxing by isomerization as opposed to cracking can be used, such as ZSM-48, zeolite Beta, ZSM-23, or a combination thereof. Additionally or alternately, the zeotype framework can comprise, consist essentially of, or be a 10-member ring 1-D zeotype framework. Optionally but preferably, the dewaxing catalyst can include a binder for the zeotype framework, such as alumina, titania, silica, silica-alumina, zirconia, or a combination thereof, for example alumina and/or titania or silica and/or zirconia and/or titania.

Aside from the zeotype framework(s) and optional binder, the dewaxing catalyst can also include at least one metal hydrogenation component, such as a Group 8-10 metal. Suitable Group 8-10 metals can include, but are not limited to, Pt, Pd, Ni, or a combination thereof. When a metal hydrogenation component is present, the dewaxing catalyst can include 0.1 wt % to 10 wt % of the Group 8-10 metal, or 0.1 wt % to 5.0 wt %, or 0.5 wt % to 10 wt %, or 0.5 wt % to 5.0 wt %, or 1.0 wt % to 10 wt %, or 1.0 wt % to 5.0 wt %.

In some aspects, the dewaxing catalyst can include an additional Group 6 metal hydrogenation component, such as W and/or Mo. In such aspects, when a Group 6 metal is present, the dewaxing catalyst can include 0.5 wt % to 20 wt % of the Group 6 metal, or 0.5 wt % to 10 wt %, or 2.5 wt % to 20 wt %, or 2.5 wt % to 10 wt %. As one example, the dewaxing catalyst can include 0.1 wt % to 5.0 wt % Pt and/or Pd as the hydrogenation metal component. As another example, the dewaxing catalyst can include as the hydrogenation metal components Ni and W, Ni and Mo, or Ni and a combination of W and Mo.

Catalytic dewaxing can be performed by exposing a feedstock to a dewaxing catalyst under effective (catalytic) dewaxing conditions. Dewaxing conditions can include temperatures of 550° F. (288° C.) to 840° F. (449° C.), hydrogen partial pressures of from 250 psig to 5000 psig (1.8 MPag to 34.6 MPag), and hydrogen treat gas rates of from 34 $Nm^3/m^3$ to 1700 $sm^3/m^3$ (~200 SCF/B to ~10,000 SCF/B). The liquid hourly space velocity (LHSV) of the feed relative to the dewaxing catalyst can be characterized can be from about 0.1 $hr^{-1}$ to about 10 $hr^{-1}$.

Additionally or alternately, still other hydrodeoxygenation conditions can correspond to hydrocracking conditions and/or aromatic saturation conditions. Such hydrocracking conditions and/or aromatic saturation conditions can be used conjunction with a conventional hydrotreating catalyst, aromatic saturation catalyst, and/or hydrocracking catalyst in order to perform hydrodeoxygenation.

It is noted that when hydrodeoxygenating a bio-derived fraction either alone, with other co-feed(s) having a reduced or minimized sulfur content, and/or with a reduced or minimized amount of sulfur-containing mineral co-feed(s), the sulfur content of the feed for hydrodeoxygenation can potentially be 300 wppm or less, or 200 wppm or less, or 100 wppm or less, such as down to 0.1 wppm or possibly still lower. It is noted that many types of bio-derived feeds can have sulfur contents of 10 wppm or less. Such feeds can often also have oxygen contents of substantially more than 1.0 wt %, such as 1.0 wt % to 15 wt %. When using such bio-derived feeds with a substantial oxygen content and little or no sulfur content, even co-processing a small amount of a mineral feedstock can still result in a combined feed with a sulfur content of 300 wppm or less and an oxygen content of 1.0 wt % or more. For such feeds having substantial oxygen contents while having little or no sulfur content, the sulfided metals on the catalyst for hydrodeoxygenation can potentially be converted back into oxide form, thus reducing the activity of the catalyst. In such aspects, an additional sulfur source can be added to the hydrodeoxygenation environment so that the hydrodeoxygenation catalyst is maintained in a sulfided state. This can be achieved, for example, by adding a spiking agent such as dimethyl disulfide (DMDS) to the feedstock, by adding $H_2S$ to the hydrogen treat gas, or in another convenient manner.

EXAMPLES

To further illustrate the various types of configurations, a series of simulations were performed for hydrodeoxygenation of a model bio-derived feed while maintaining a target temperature profile within a reactor. Simulations were performed done using a commercial steady state process simulation package (Aveva Pro/II) in combination with a thermodynamics library that was updated based on additional data. The simulations were used to investigate two types of strategies for the target temperature profile. In one type of strategy, the goal was to maintain the bed outlet temperature (i.e., temperature at the bottom of a catalyst bed) for each catalyst bed at roughly the same temperature. In a second strategy, the goal was to maintain the weighted bed average temperature for each catalyst bed.

In the series of simulations, the feed stream was split into a fixed number of streams with each stream having a different flowrate. Each stream was fed into the region above a different bed in the reactor.

The total hydrogen feed to the first bed was fixed at roughly four times the total expected chemical consumption of hydrogen. The temperature rise across any bed was limited to 100° F. Additionally, the bed outlet temperature for each bed was limited to a maximum of 800° F. (427° C.), and the pressure within the reactor was limited to roughly 975 psig (~6.7 MPa-g). These values were selected based on typical materials used for construction of hydroprocessing reactors, but higher values could be appropriate depending on the nature of the materials used to form a reactor.

Example 1 below corresponds to simulations based on the configuration shown in FIG. 1. Example 2 below corresponds to simulations based on the configuration shown in FIG. 2. Example 3 below corresponds to simulations based on the configuration shown in FIG. 3. Example 4 below corresponds to simulations based on the configuration shown in FIG. 4.

With regard to scale for the simulation, the calculations were designed to simulate conversion of 10 kBD of a model canola oil into renewable diesel. The canola oil composition used in the simulations is shown in Table 1.

TABLE 1

Typical Composition of Canola Oil

| Component | Chemical formula | Wt % |
|---|---|---|
| Oleic | $C_{18}H_{34}O_2$ | 70 |
| Linoleic | $C_{18}H_{32}O_2$ | 20 |
| Linolenic | $C_{18}H_{30}O_2$ | 10 |

The total heat release from hydrodeoxygenation of the model feed was assumed to be 61 MM BTU/hr for 10 kBD capacity, or 6.1 MM BTU/hr/kBD. For SOR conditions, it was assumed that the each bed outlet temperature was the same at 648° F. and all the beds in the reactor were operated using equal outlet bed temperatures. In other aspects, any other convenient bed outlet temperature can be selected. In other aspects, the bed outlet temperature can vary for different catalyst beds.

In the calculations, it was assumed that in the primary reactions taking place, these components are converted in to $C_{18}$ paraffin molecules and water. Thus, the reactions shown in Equations (2)-(4) were modeled as occurring in the reactor:

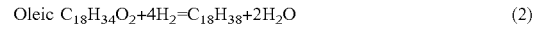

$$\text{Oleic } C_{18}H_{34}O_2 + 4H_2 = C_{18}H_{38} + 2H_2O \qquad (2)$$

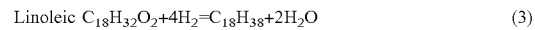

$$\text{Linoleic } C_{18}H_{32}O_2 + 4H_2 = C_{18}H_{38} + 2H_2O \qquad (3)$$

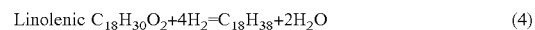

$$\text{Linolenic } C_{18}H_{30}O_2 + 4H_2 = C_{18}H_{38} + 2H_2O \qquad (4)$$

In practice, hydrodeoxygenation reactions can be much more complicated, and can result in formation of a variety of products including CO, $CO_2$, propane and other light ends plus a range of paraffin molecules are produced that have a TBP curve characteristic of a diesel stream. The purpose of this simulation is to illustrate the concept proposed in this invention.

The hydrogen stream used for the reaction was assumed to be pure hydrogen. The chemical consumption of $H_2$ was assumed to be 2000 SCF/bbl (~340 $Nm^3/m^3$).

The catalyst modeled in the simulations corresponded to Mo supported on a refractory support. The amount of catalyst in each bed was selected so that the space velocity for the total feed across each bed was roughly 1 hr$^{-1}$.

Example 1—Cooling with Heat Exchangers

In a first set of simulations, a configuration similar to FIG. 2 was used for hydrodeoxygenation of the model canola oil feed. Thus, for all catalyst beds prior to the final catalyst bed, the deoxygenated effluent exiting from the catalyst bed was passed through a heat exchanger and then passed back into the region above the next catalyst bed. The cooled deoxygenated effluent was then mixed with fresh feed prior to entering the next catalyst bed. By adjusting the amount of heat exchange, the temperature of the total flow entering the next catalyst bed was controlled in order to maintain a target temperature profile for the catalyst beds and/or the reactor.

In the first set of simulations, the target temperature profile included having roughly the same weighted average bed temperature (WABT), as defined above, for each catalyst bed. The simulations were designed to model processing of 10 kilo barrels per day (10 kBPD) of the model canola oil shown in Table 1. Table 2 shows the amount of fresh feed introduced in the region above each bed and the corresponding amount of deoxygenation catalyst included in each catalyst bed to achieve a WHSV of 1.0 hr$^{-1}$ across each bed.

TABLE 2

Feed and Catalyst for Simulations with Heat Exchangers for Temperature Control

| Catalyst Bed | Fresh Feed Rate (kBPD) | % of Fresh Feed | Catalyst Volume (ft$^3$) |
|---|---|---|---|
| 1 | 1.15 | 11 | 270 |
| 2 | 1.38 | 14 | 324 |
| 3 | 1.85 | 19 | 435 |
| 4 | 2.50 | 25 | 588 |
| 5 | 3.12 | 31 | 732 |
| Totals: | 10 | 100 | 2350 |

At the start of each modeled run, the WABT for each bed was roughly 615° F. (324° C.). At end of run, the WABT for each bed was roughly 680° F. (360° C.). Assuming a bed temperature rise of 100° F., each bed inlet temperature was roughly 548° F. (287° C.) at start of run and 613° F. (323° C.) at end of run. Bed outlet temperatures were roughly 648° F. (342° C.) at start of run and 713° F. (378° C.) at end of run.

In order to maintain the target temperature profile, the heat exchangers between beds were operated with the following heat exchange duties. The heat exchanger between beds 1 and 2 operated with a heat exchanger duty of roughly 3 million BTU/hr (or MM BTU/hr). The heat exchanger between beds 2 and 3 operated with a heat exchanger duty of roughly 4 MM BTU/hr. The heat exchanger between beds 3 and 4 operated with a heat exchanger duty of roughly 5 MM BTU/hr. The heat exchanger between beds 4 and 5 operated with a heat exchanger duty of roughly 8 MM BTU/hr. These are reasonable heat exchanger duties for conventional heat exchanger configurations.

FIG. 5 shows the results from the simulations for steady state operation. In FIG. 5, the composition of reactants passed into each region is shown. For region 1, this corresponds to the fresh feed plus hydrogen introduced into the region above the first catalyst bed (such as region 110 in FIG. 2). For region 2 (such as region 120 in FIG. 2), this corresponds to the fresh feed introduced between the first catalyst bed and second catalyst bed, along with the effluent exiting from the first catalyst bed. Subsequent regions between catalyst beds in FIG. 5 (regions 3, 4, and 5) similarly correspond to a mixture of fresh feed and effluent from the prior catalyst bed. Finally, region 6 shows the effluent exiting from the final catalyst bed, which corresponds to the product from the reactor.

In FIG. 5, the mass of several components in the reactor is described. The components shown in FIG. 5 include fresh feed, hydrogen, and the effluent that exits from the prior catalyst bed. The effluent from the prior catalyst bed includes deoxygenated oil (i.e., feed that has been deoxygenated based on exposure to a catalyst bed), water that is generated during deoxygenation, light ends that are generated during deoxygenation, and hydrogen. FIG. 5 also shows the temperature for fresh feed and fresh hydrogen, the temperature of effluent from the prior bed prior to cooling, the temperature of the effluent from the prior bed after being cooled in the heat exchanger, and the temperature of the total reactants in the region. The percentage of the total mass that corresponds to a liquid in each region is also shown. Finally, the WABT for the prior catalyst bed is shown.

As shown in FIG. 5, in the simulations, the amount of fresh feed introduced into a region increased with each consecutive region. This assisted with maintaining a target temperature profile, as increasing amounts of deoxygenated oil became available as diluent for each successive catalyst bed. This required a corresponding increase in the amount of catalyst in each bed in order to maintain a target space velocity across each catalyst bed. The increasing amounts of deoxygenated oil required increasing heat exchanger duties to cool. It is noted that in FIG. 5, the total mass in a region corresponds to the amount of effluent present in the next region. As an example, the total mass in region 1 is 32763 lb/hr. This total mass includes all liquid and gas phase components. The amount of effluent in region 2 is also 32763 lb/hr, since the entire feed from region 1 is passed into region 2 as the effluent from catalyst bed 1.

As shown in FIG. 5, by distributing the fresh feed into multiple regions within a reactor so that a relatively low percentage of the fresh feed is passed into region 1, and by using heat exchangers to reduce the temperature of the effluent between catalyst beds, a target temperature profile can be maintained within the reactor. In this case, the target temperature profile includes having a maximum bed outlet temperature of 342° C. while also having substantially the same WABT for each catalyst bed. In other aspects, other target conditions can be selected.

Example 2—Cooling with Hydrogen Quench Gas

In a second set of simulations, a configuration similar to FIG. 1 was used for hydrodeoxygenation of the model canola oil feed. Thus, hydrogen quench gas streams were used to assist with maintaining the target temperature profile in the reactor. FIG. 6 shows the mass flows and temperatures for the second set of simulations at steady state.

Because hydrogen quench gas is used for cooling rather than heat exchangers, one of the differences between FIG. 5 and FIG. 6 is that additional fresh hydrogen is added into regions 2, 3, 4, and 5 as part of maintaining a target temperature profile. In order to facilitate comparison with the first set of simulations, the target temperature profile included a target of maintaining substantially the same WABT across each catalyst bed. However, in part due to the additional hydrogen provided into the reaction environment, the distribution of feed into the various regions was different in the second set of simulations. Table 3 shows the distribution of fresh feed and corresponding distribution of catalyst between the catalyst beds for the second set of simulations. It is noted that the feed distribution in Table 3 does not match the examples of feed percentages that are shown in FIG. 1.

TABLE 3

Feed and Catalyst for Simulations with Hydrogen Quench Gas for Temperature Control

| Catalyst Bed | Fresh Feed Rate (kBPD) | % of Fresh Feed | Catalyst Volume (ft$^3$) |
|---|---|---|---|
| 1 | 1.15 | 11 | 269 |
| 2 | 1.50 | 15 | 353 |
| 3 | 2.18 | 22 | 511 |
| 4 | 3.17 | 32 | 745 |
| 5 | 2.01 | 20 | 472 |
| Totals: | 10 | 100 | 2350 |

As shown in Table 3, in this set of simulations, the amount of fresh feed increases for the first four regions, but is reduced for the fifth region. More generally, while increasing the amount of fresh feed delivered to the second bed relative to the first bed can assist with maintaining a target temperature profile, it is not necessary for the amount of fresh feed to increase in subsequent beds. Using increasing amounts of fresh feed can reduce or minimize the total number of catalyst beds, but in other aspects using additional catalyst beds can potentially allow the feed amount to decrease after the first catalyst bed. It is noted that the same total volume of catalyst is used in both Example 1 and this example, but the distribution between the catalyst beds is different based on the different distribution of fresh feed between the regions.

FIG. 6 shows mass balance and temperature details for the simulations based on the configuration shown in FIG. 1. As shown in FIG. 6, the mass balance in each region is slightly different, due in part to the different fresh feed distribution between the regions and the addition of fresh hydrogen prior to each catalyst bed. However, the overall target temperature profile is similar, with each catalyst bed having the same WABT.

Additional Embodiments

Embodiment 1. A method for performing hydrodeoxygenation, comprising: exposing a first portion of a feedstock comprising 1.0 wt % or more of oxygen to a first hydroprocessing catalyst in a first catalyst bed in the presence of a hydrogen-containing treat gas under first hydroprocessing conditions to form a first liquid product effluent comprising 0.5 wt % or less of oxygen and a first gas product effluent, the first portion of the feedstock comprising 5.0 wt % to 30 wt % of the feedstock; cooling at least a portion of the first liquid product effluent; exposing the cooled at least a portion of the first liquid product effluent, at least a portion of the first gas product effluent, and a second portion of the feedstock to a second hydroprocessing catalyst in a second catalyst bed under second hydroprocessing conditions to form a second liquid product effluent comprising 0.5 wt % or less of oxygen and a second gas product effluent; cooling at least a portion of the second liquid product effluent; and exposing the cooled at least a portion of the second liquid product effluent, at least a portion of the second gas product effluent, and a remaining portion of the feedstock to at least one additional hydroprocessing catalyst in at least one additional catalyst bed under at least one additional hydroprocessing condition to form a final liquid product effluent comprising 0.5 wt % or less of oxygen and a final gas product effluent.

Embodiment 2. The method of Embodiment 1, wherein a weighted average bed temperature of the first catalyst bed differs from a weighted average bed temperature of the second catalyst bed by 20° C. or less.

Embodiment 3. The method of any of the above embodiments, wherein a temperature difference across the first catalyst bed is 60° C. or less, or wherein a temperature difference across the second catalyst bed is 60° C. or less, or a combination thereof.

Embodiment 4. The method of any of the above embodiments, wherein the second portion of the feedstock comprises a higher weight percentage of the feedstock than the first portion of the feedstock.

Embodiment 5. The method of any of the above embodiments, wherein exposing the remaining portion of the feedstock to hydroprocessing catalyst in at least one additional catalyst bed under at least one additional hydroprocessing condition comprises exposing a third portion of the feedstock to a third hydroprocessing catalyst in a third catalyst bed under third hydroprocessing conditions to form a third liquid product effluent and a third gas product effluent.

Embodiment 6. The method of Embodiment 5, wherein the third portion of the feedstock comprises a higher weight percentage of the feedstock than the first portion of the feedstock; or wherein the weight percentage of the feedstock exposed to a catalyst bed is increased for three or more consecutive catalyst beds; or a combination thereof.

Embodiment 7. The method of Embodiment 5 or 6, the method further comprising: cooling at least a portion of the third liquid product effluent; exposing the cooled at least a portion of the third liquid product effluent, at least a portion of the third gas product effluent, and a fourth portion of the feedstock to a fourth hydroprocessing catalyst in a fourth catalyst bed under fourth hydroprocessing conditions to form a fourth liquid product effluent comprising 0.5 wt % or less of oxygen and a fourth gas product effluent.

Embodiment 8. The method of Embodiment 5 or 6, the method further comprising: exposing an intermediate effluent comprising i) at least a portion of the third liquid product effluent and ii) at least a portion of the third gas product effluent, to a supplemental hydroprocessing catalyst in a supplemental catalyst bed under supplemental hydroprocessing conditions to form a fourth liquid product effluent comprising 0.5 wt % or less of oxygen and a fourth gas product effluent, the intermediate effluent comprising 0.0 wt % to 3.0 wt % of the feedstock relative to a weight of the feedstock, the at least a portion of the third liquid product effluent optionally comprising a cooled portion of the third liquid product effluent.

Embodiment 9. The method of any of the above embodiments, wherein the cooled at least a portion of the first liquid product effluent comprises substantially all of the first liquid product effluent, or wherein the at least a portion of the first gas product effluent comprises substantially all of the first gas product effluent, or a combination thereof.

Embodiment 10. The method of any of the above embodiments, wherein the first liquid product effluent is cascaded into a region above the second catalyst bed, or wherein the first gas product effluent is cascaded into a region above the second catalyst bed, or a combination thereof.

Embodiment 11. The method of any of the above embodiments, wherein cooling at least a portion of the first liquid product effluent comprises quenching the at least a portion of the first liquid product with a hydrogen-containing quench gas, or wherein cooling at least a portion of the first liquid product effluent comprises passing the at least a portion of the first liquid product effluent through a heat exchanger, or a combination thereof.

Embodiment 12. The method of any of the above embodiments, wherein cooling at least a portion of the second liquid product effluent comprises quenching the at least a portion of the second liquid product with a hydrogen-containing quench gas, or wherein cooling at least a portion of the second liquid product effluent comprises passing the at least a portion of the second liquid product effluent through a heat exchanger, or a combination thereof.

Embodiment 13. The method of any of the above embodiments, wherein cooling at least a portion of the first liquid product effluent comprises mixing the at least a portion of the first liquid product effluent with a recycle portion of the final liquid product effluent; or wherein cooling at least a portion of the second liquid product effluent comprises mixing the at least a portion of the second liquid product effluent with a recycle portion of the final liquid product effluent; or a combination thereof.

Embodiment 14. The method of any of the above embodiments, wherein the first hydroprocessing conditions are different from the second hydroprocessing conditions, or wherein the first hydroprocessing catalyst is different from the second hydroprocessing catalyst, or a combination thereof.

Embodiment 15. The method of claim 1, a) wherein the first hydroprocessing conditions comprises hydrotreating conditions, catalytic dewaxing conditions, aromatic saturation conditions, hydrodeoxygenation conditions, hydrocracking conditions, or a combination thereof; b) wherein the first hydroprocessing catalyst comprises a hydrotreating catalyst, a dewaxing catalyst, an aromatic saturation catalyst, a hydrodeoxygenation catalyst, a hydrocracking catalyst, or a combination thereof; or c) a combination of a) and b).

Additional Embodiment A. The method of any of the above embodiments, wherein the feedstock comprises 50 wt % or more of a bio-derived fraction.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for performing hydrodeoxygenation, comprising:
    exposing an undiluted first portion of a feedstock comprising 1.0 wt % or more of oxygen to a first hydroprocessing catalyst in a first catalyst bed in the presence of a hydrogen-containing treat gas under first hydroprocessing conditions to form a first liquid product effluent comprising 0.5 wt % or less of oxygen and a first gas product effluent, the undiluted first portion of the feedstock comprising 5.0 wt % to 30 wt % of the feedstock, wherein substantially no recycled liquid product stream is exposed to the first catalyst bed during a steady state operation;
    cooling at least a portion of the first liquid product effluent;
    exposing the cooled at least a portion of the first liquid product effluent, at least a portion of the first gas product effluent, and a second portion of the feedstock to a second hydroprocessing catalyst in a second catalyst bed under second hydroprocessing conditions to form a second liquid product effluent comprising 0.5 wt % or less of oxygen and a second gas product effluent;
    cooling at least a portion of the second liquid product effluent; and
    exposing the cooled at least a portion of the second liquid product effluent, at least a portion of the second gas product effluent, and a remaining portion of the feedstock to at least one additional hydroprocessing catalyst in at least one additional catalyst bed under at least one additional hydroprocessing condition to form a final liquid product effluent comprising 0.5 wt % or less of oxygen and a final gas product effluent.

2. The method of claim 1, wherein a weighted average bed temperature of the first catalyst bed differs from a weighted average bed temperature of the second catalyst bed by 20° C. or less.

3. The method of claim 1, wherein a temperature difference across the first catalyst bed is 60° C. or less, or wherein a temperature difference across the second catalyst bed is 60° C. or less, or a combination thereof.

4. The method of claim 1, wherein the second portion of the feedstock comprises a higher weight percentage of the feedstock than the undiluted first portion of the feedstock.

5. The method of claim 1, wherein exposing the remaining portion of the feedstock to hydroprocessing catalyst in at least one additional catalyst bed under at least one additional hydroprocessing condition comprises exposing a third portion of the feedstock to a third hydroprocessing catalyst in a third catalyst bed under third hydroprocessing conditions to form a third liquid product effluent and a third gas product effluent.

6. The method of claim 5, wherein the third portion of the feedstock comprises a higher weight percentage of the feedstock than the undiluted first portion of the feedstock.

7. The method of claim 5, wherein the weight percentage of the feedstock exposed to a catalyst bed is increased for three or more consecutive catalyst beds.

8. The method of claim 5, the method further comprising:
    cooling at least a portion of the third liquid product effluent;
    exposing the cooled at least a portion of the third liquid product effluent, at least a portion of the third gas product effluent, and a fourth portion of the feedstock to a fourth hydroprocessing catalyst in a fourth catalyst bed under fourth hydroprocessing conditions to form a fourth liquid product effluent comprising 0.5 wt % or less of oxygen and a fourth gas product effluent.

9. The method of claim 5, the method further comprising:
    exposing an intermediate effluent comprising:
    at least a portion of the third liquid product effluent and
    at least a portion of the third gas product effluent
    to a supplemental hydroprocessing catalyst in a supplemental catalyst bed under supplemental hydroprocessing conditions to form a fourth liquid product effluent comprising 0.5 wt % or less of oxygen and a fourth gas product effluent, the intermediate effluent comprising 0.0 wt % to 3.0 wt % of the feedstock relative to a weight of the feedstock.

10. The method of claim 9, wherein the at least a portion of the third liquid product effluent comprises a cooled portion of the third liquid product effluent.

11. The method of claim 1, wherein the cooled at least a portion of the first liquid product effluent comprises substantially all of the first liquid product effluent, or wherein the at least a portion of the first gas product effluent comprises substantially all of the first gas product effluent, or a combination thereof.

12. The method of claim 1, wherein the first liquid product effluent is cascaded into a region above the second catalyst bed, or wherein the first gas product effluent is cascaded into a region above the second catalyst bed, or a combination thereof.

13. The method of claim 1, wherein cooling at least a portion of the first liquid product effluent comprises quenching the at least a portion of the first liquid product with a hydrogen-containing quench gas, or wherein cooling at least a portion of the first liquid product effluent comprises passing the at least a portion of the first liquid product effluent through a heat exchanger, or a combination thereof.

14. The method of claim 1, wherein cooling at least a portion of the first liquid product effluent comprises mixing the at least a portion of the first liquid product effluent with a recycle portion of the final liquid product effluent.

15. The method of claim 1, wherein cooling at least a portion of the second liquid product effluent comprises quenching the at least a portion of the second liquid product with a hydrogen-containing quench gas, or wherein cooling at least a portion of the second liquid product effluent comprises passing the at least a portion of the second liquid product effluent through a heat exchanger, or a combination thereof.

16. The method of claim 1, wherein cooling at least a portion of the second liquid product effluent comprises mixing the at least a portion of the second liquid product effluent with a recycle portion of the final liquid product effluent.

17. The method of claim 1, wherein the first hydroprocessing conditions are different from the second hydroprocessing conditions, or wherein the first hydroprocessing catalyst is different from the second hydroprocessing catalyst, or a combination thereof.

18. The method of claim 1, wherein the first hydroprocessing conditions comprise hydrodeoxygenation conditions, or wherein the first hydroprocessing catalyst comprises a hydrodeoxygenation catalyst, or a combination thereof.

19. The method of claim 1, a) wherein the first hydroprocessing conditions comprises hydrotreating conditions, catalytic dewaxing conditions, aromatic saturation conditions, hydrodeoxygenation conditions, hydrocracking conditions, or a combination thereof; b) wherein the first hydroprocessing catalyst comprises a hydrotreating catalyst, a dewaxing catalyst, an aromatic saturation catalyst, a hydrodeoxygenation catalyst, a hydrocracking catalyst, or a combination thereof; or c) a combination of a) and b).

20. The method of claim 1, wherein the feedstock comprises 50 wt % or more of a bio-derive fraction.

* * * * *